Jan. 30, 1968 R. W. JONES 3,366,375
FURNACE WALL STRUCTURE
Filed Oct. 12, 1964 3 Sheets-Sheet 1

INVENTOR.
Robert W. Jones.
BY
Harness, Dickey & Pierce.
ATTORNEYS

INVENTOR.
Robert W. Jones.
BY
Barnes, Dickey & Pierce.
ATTORNEYS

Jan. 30, 1968  R. W. JONES  3,366,375
FURNACE WALL STRUCTURE
Filed Oct. 12, 1964  3 Sheets-Sheet 3
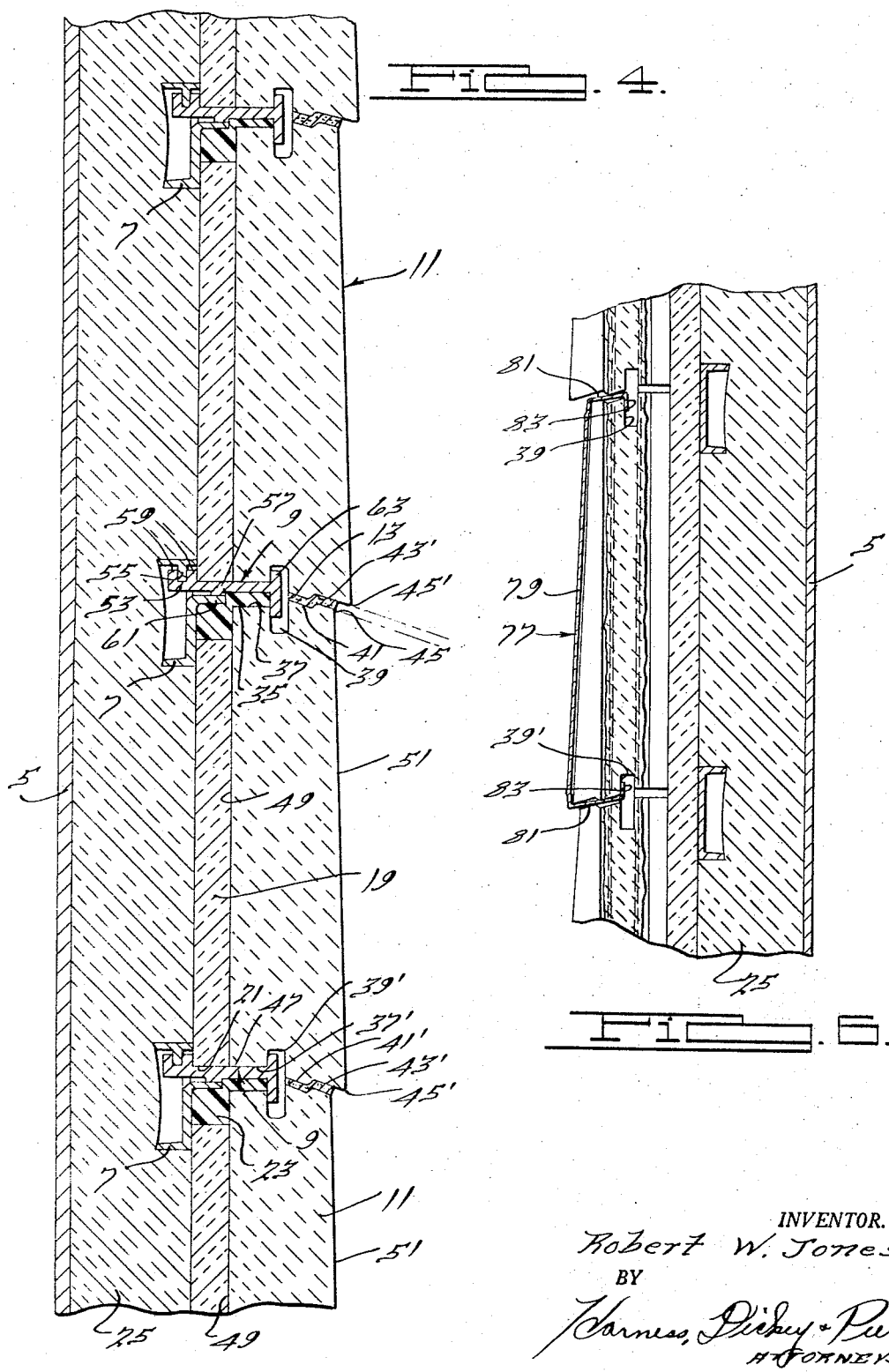
INVENTOR.
Robert W. Jones.
BY
Harness, Dickey & Pierce
ATTORNEYS.

United States Patent Office 3,366,375
Patented Jan. 30, 1968

3,366,375
FURNACE WALL STRUCTURE
Robert W. Jones, Birmingham, Mich., assignor to Bigelow-Liptak Corporation, a corporation of Michigan
Filed Oct. 12, 1964, Ser. No. 403,181
9 Claims. (Cl. 263—46)

This invention relates to tile lined vessels or furnaces, and, in particular, is concerned with catalyst-regenerator vessels such as TCC kilns and with spray or settling chambers such as used in industrial incinerators, gas scrubbers, and air pollution control units.

In the petroleum refining industry certain bead-like catalysts are used in the cracking processes and during the course of use acquire a coating of carbon. In order to reactivate or regenerate them, the coated beads of catalysts are charged into a TCC kiln or regenerator vessel, which may be of various shapes, where they are heated to temperatures of 1200° F. or so and exposed to oxidizing gases which will burn off the coating of carbon; whereupon the reactivated beads are removed and used again in the refining processes.

Because of the temperaures involved and the abrasive nature of the catalytic beads, vessels used for the generation of such beads are commonly lined with refractory tile. This tile is in the form of individual blocks and consequently there are joints between them as well as joints provided to accommodate expansion and contraction when the vessel is heated and cooled. When catalyst beads are piled inside the vessel they are in contact with the inner faces of the refractory tile and, in previous constructions, would flow into the joints between the tile. The beads are extremely hard, and when the joints would close due to expansion, the resistance of the hard bead elements to such closing would set up forces in the tile blocks that caused them to shear off.

In spray or settling chambers, the comparable problem is that the water which runs down the inner faces of the refractory tile is usually slightly acidic and corrosive and gets into the mortar of the horizontal tile joints and causes it to deteriorate as well as corrosion of hangers and castings.

It is the purpose of the present invention to provide a refractory tile shape and arrangement to prevent the catalyst beads from entering the joints and, hence, to provide a means to overcome the aforementioned problem.

It is also a purpose of the invention to provide a tile shape and arrangement that may be used in settling chambers so that the water runs down the face of the wall without getting into the joints.

The invention achieves the foregoing purpose by means of a relatively simple change in the shape of the wall tile. By means of this change the upper and lower edges of each horizontal joint are located so that the angle they define is non-vertical and inclined away from the horizontal joint beneath it. In the case of catalyst regenerators, the angle of inclination is substantially greater with respect to the vertical than the angle of repose of the catalytic beads or pebbles. Consequently, it is not possible for the beads to flow by gravity into the joint. With respect to vertical expansion joints, a shroud is provided to prevent entry of beads.

The invention is illustrated in the accompanying drawings in which:

FIG. 4 is a section along the line 4—4 of FIG. 3;

FIG. 6 is a section along line 6—6 of FIG. 2.

The vessel 1 typifies the type of industrial furnace that may embody the invention. The particular unit shown is a donut-contour TCC kiln for reactivating catalytic beads or pebbles that have been coated with carbon. The beads are fed through the chute 3 and dropped by gravity to the bottom of the vessel 1 where they simply pile up until they reach the desired height in the vessel. Suitable means (not shown) are provided for heating the vessel and its contents to a desired temperaure, normally in the neighborhood of 1200° F. for reactivating the catalyst beads. At this temperature the passage of air or oxygen through the bed of catalyst will burn off the carbon coating whereupon the catalyst beads can be removed from the vessel 1 and reused in refining procedures.

Figure 1:
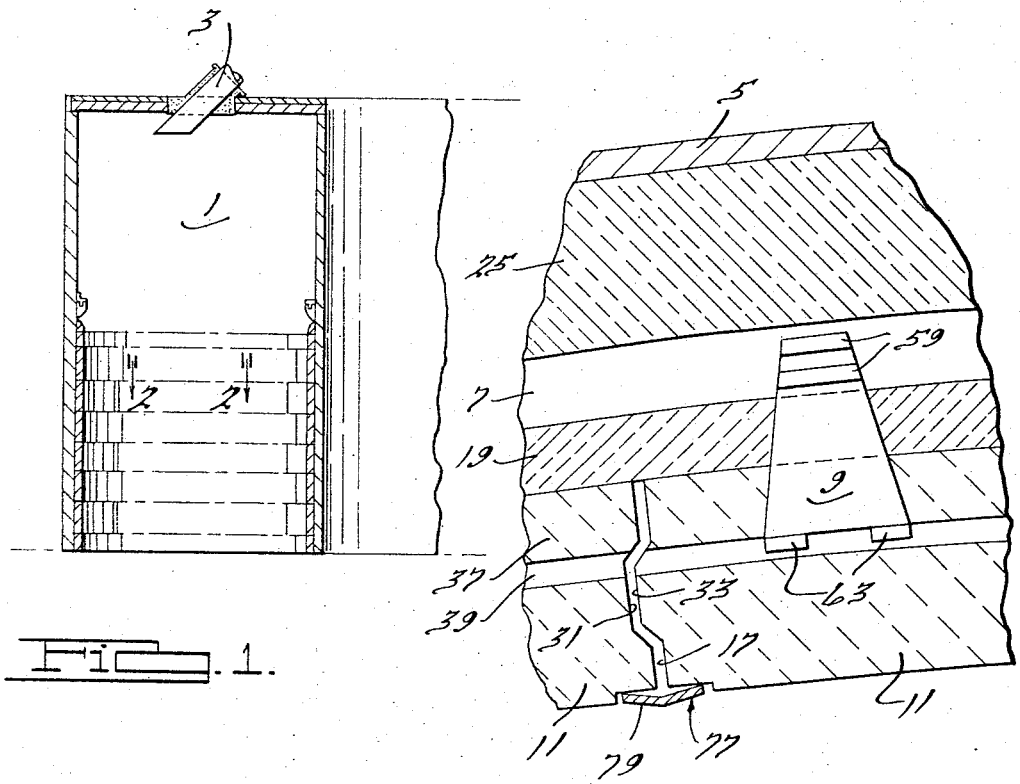
FIGURE 1 is somewhat schematic, vertical section through a portion of a refractory lined vessel embodying the invention.
Figure 2A:
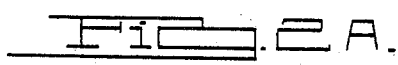
FIG. 2A is a further enlargement of a section similar to FIG. 2 as taken on line 2A—2A of FIG. 3.
Figure 2:
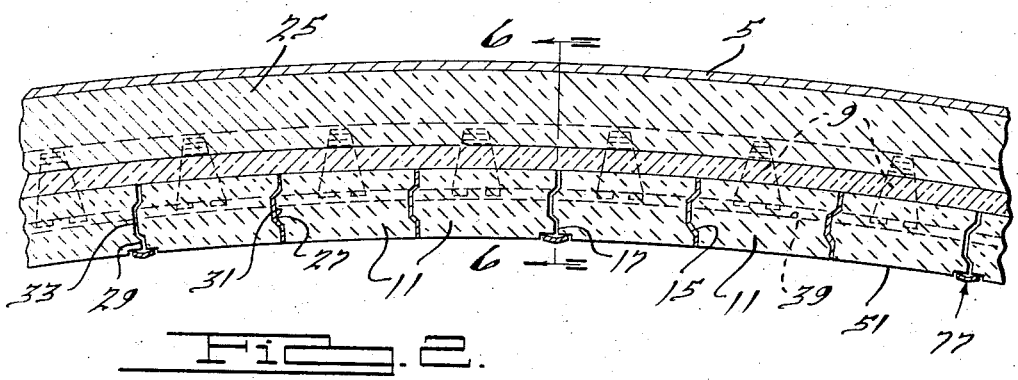
FIGURE 2 is a horizontal section taken along the line 2—2 of FIG. 1 and enlarged.

As best seen in FIGS. 2-6 the vessel 1 has an outer steel shell 5 and suitably supported on it, or upon other structural framework, are the horizontally extending metal wall bracket castings 7. The brackets 7 support the various tile clips or hangers 9, one such hanger being used for each of the tile blocks 11. There are horizontal joints 13 between the vertically adjacent tile blocks 11 and vertical joints 15 between the horizontally adjacent tile blocks 11. The joints 13 and 15 are filled with a fire clay. Additionally, there are vertical expansion joints 17 preferably provided at every third joint as indicated in FIG. 2, but these are left open to accommodate expansion. The space between the bracket 7 and the outer face of the tile blocks 11 is filled with a block insulation 19 which has suitable openings 21 for the passage of the various hangers 9, such openings being filled with plastic insulation 23. Outwardly of the layer of insulation 19 is castable insulation 25 to fill the space between the layer 19 and the steel shell wall 5.

The tile blocks 11 have vertical side faces 27 and 29 (FIG. 2) one of which is provided with a tapered vertical groove 31 and the other which is provided with a correspondingly shaped projection 33. As can be seen in FIG. 2, the projection on one tile block fits into the groove on the other to provide a vertical joint 17 that is tortuous or irregular in shape. The top face 35 of each tile block 11 has a flat section at the back 37, a horizontal slot 39, and a pair of inclined front sections 41 and 43 terminating in a front edge or corner 45. Similarly, the bottom face 47 of each tile has a flat section 37', a horizontal slot 39', a pair of inclined sections 41' and 43' and a bottom edge or corner 45'. The back face 49 of each tile block 11 is parallel to the vertical while the front face 51 of each of the tile blocks is at a slight angle to the vertical so that the top of the block is somewhat narrower than the bottom of the blocks. Thus, the bottom edge 45' of one tile block 11 is spaced upwardly and outwardly from the top corner or edge 45 of the tile block that is immediately below it. It will be appreciated that the corners 45 and 45' define the edges of the horizontal joints 13 between vertically adjacent tile blocks.

The wall brackets 7 are generally of a channel cross section and have an opening 53 in the web 55 through which a horizontal section 57 on the hanger 9 extends. The hanger section 57 has a pair of flanged sections 59 that fit on opposite sides of the web 55. The section 57 has a small nib 60 that bears on a flange 61 that extends at right angles to the bracket 7 and forms a ledge to support the hanger 9. The inner-most end of the hanger 9 has a pair of flanges 63 extending up and down from the section 57 which fit in the tile slots 39 and 39' and it is clear from FIG. 4 that the hanger 7 can serve as a shelf for the tile resting on it, that is the tile that is vertically above it, and at the same time it can serve as a hook to prevent outward tilting of the tile 11 that is immediately below it.

Figure 5:
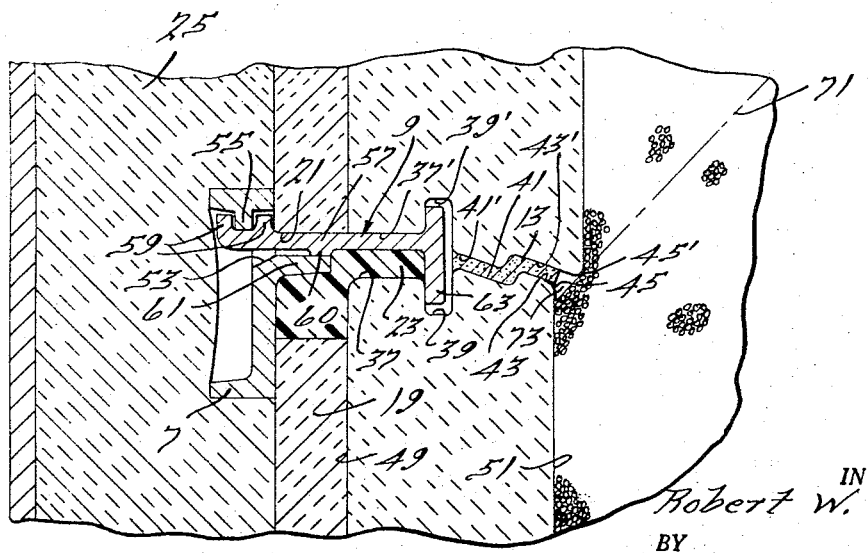
FIG. 5 is an enlarged view of a vertical section such as shown in FIG. 4 and shows the pebbles resting against the inner faces of the tile.

As can be seen best in FIG. 5, the angle defined by a line through the corners 45 and 45' which defines the inlet opening to the joint 13 makes a relatively large angle with the vertical. This angle is more than the angle of repose of the catalyst beads as indicated by the lines 71. Thus, there will be a pocket 73 between the beads and the joint 13 which cannot be reached by the catalyst beads when they flow under the influence of gravity. Consequently, the beads cannot enter the joint 13 and cause the destructive effects mentioned above.

Figure 3:
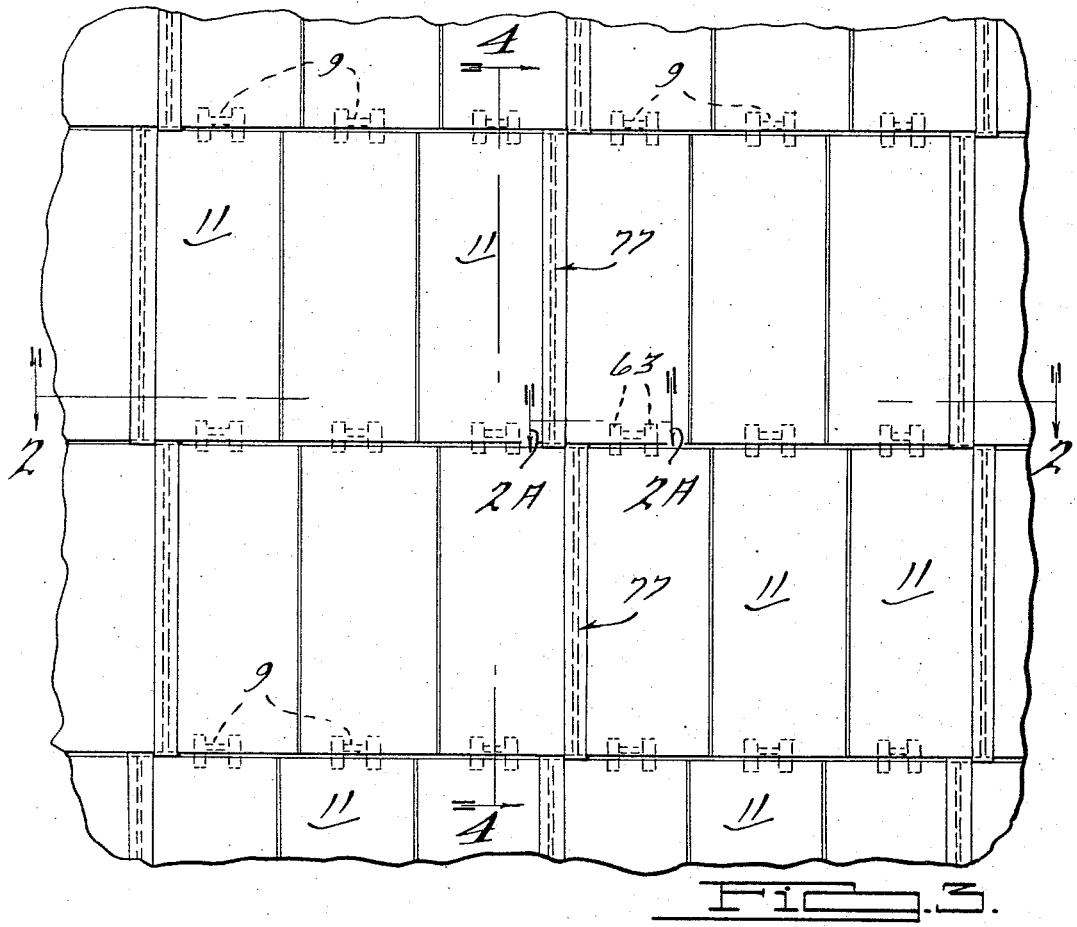
FIG. 3 is a partial view looking at a vertical inside face of the inner wall of the vessel.

The various vertical joints are, of course, staggered as indicated in FIG. 3. The expansion joints 17 are covered by alloy shrouds 77. These have a front vertical leg or face 79 which is V-shaped as seen in FIGS. 2 and 2A which is of a length comparable to that of the tile blocks 11. At the ends of the face 79 are horizontal arms 81 and these are turned in at the ends in flanges 83. The adjacent vertical edges of tile that form the expansion joints 17 are recessed or relieved in corner grooves 85 and the V-face 79 of the shroud 77 is seated in a recess and extends parallel to the front faces 51. The back flanges 83 snap into the grooves 39 and 39' of the tile, the arms 81 being angled to extend through the front parts of horizontal joints 13, and hold the front face 79 of the shroud tightly in place against the front faces of the tile. The arms 81 are somewhat flexible and provide a spring-like action to hold the shrouds in place and accommodate relative movement due to different coefficients of expansion.

The invention may also be embodied in a similar manner in the walls of spray or settling chambers for industrial incinerators, scrubbers for gases, air pollution chambers, and the like. Structurally, these applications may be almost identical to the vessel illustrated. These chambers normally operate at temperatures in the range of 600° F. to 1800° F. In these applications, where it is water rather than solid beads which are settling out, the angle of repose is not significant. However, the tile is designed to have faces 51 that are inclined on an angle such as to provide a sufficient overhang so that the water does not flow by adherence to the bottom face 43' of the tile into the joint 13 at the bottom of the tile. The faces 43' are preferably also on an angle as indicated to further inhibit flow into the joint. Thus, the acidic water will not work its way through the mortar in joints 13 to attack the steel hangers and brackets 7 and 9. The force of gravity plus the incline of faces 51 effectively keeps the water from entering the vertical joints 15 in these applications.

Modifications may be made in the specific structure that has been shown without departing from the spirit and scope of the invention. Also the invention can be utilized in applications other than the specific one described and illustrated without departing from its spirit and scope.

I claim:

1. A tile block for use in a refractory suspended construction, said tile block having a top, a bottom, a front, a rear, and side faces, said front face diverging away from said rear face from top to bottom whereby said block is thicker adjacent said bottom face than adjacent said top face, aligned slots extending into said block from said top face and from said bottom face, said slots being parallel to and adjacent said rear face for facilitating suspension of said tile block in the refractory construction, the portion of said bottom face extending from the respective slot therein toward the lower edge of said front face being comprised of two parallel downwardly extending offset sections, the portion of said top face extending from the slot in said top face to the upper edge of said front face being defined by two parallel offset sections each parallel to the respective section of said bottom face.

2. In a vessel for containing a mass of flowable bead like solid particles and adapted to be heated and cooled and subjected to expansion and contraction, a wall arranged in horizontal courses disposed one above the other and having a face defining the interior of said vessel, there being a joint between each of said courses, the bottom edge of the course above each of said joints being disposed outwardly of the top edge of the course immediately below each said joint and defining an angle extending between said bottom edge and said top edge, said angle diverging outwardly of said face in a vertical direction, the flowable bead like particles adjacent each said joint defining an angle of repose, the angle between said edges being greater with respect to the vertical than the angle of repose for precluding the entry of said bead like solid particles into said joint for precluding cracking of said joint upon expansion and contraction of said vessel.

3. A vessel as set forth in claim 2 wherein the faces of the courses adjacent each of the joints define a staggered joint.

4. In a refractory lined vessel for the reactivation of catalyst beads or the like, a supporting structure, a plurality of tile blocks supported in horizontal courses on said structure, means in said horizontal courses providing for thermal expansion and contraction comprising a vertical expansion joint between adjacent blocks, said vertical expansion joint being open and susceptible to the inflow of material such as catalyst beads, the faces of tile blocks adjacent to said joint being undercut, a C-shaped shroud having a V-shaped face engaged in adjacent ones of said recesses to cover said expansion joint and having the arms thereof extending around portions of said adjacent tile blocks and hooked thereto to hold the V-shaped front face in position over said joint to prevent material from flowing into said joint.

5. The invention set forth in claim 4 including tapered faces on said tile blocks so that the tops of the blocks are narrower than the bottoms whereby the bottom of a horizontal course overhangs the top of the course beneath it.

6. In a high temperature industrial furnace for reactivating catalyst beads, settling spray, scrubbing gas or the like, an outer steel shell providing a structural framework, vertically spaced horizontally extending metal wall bracket castings supported on said framework and defining horizontal courses, horizontally extending tile hangers movably mounted on said brackets, refractory tile blocks movably carried by said hangers and having top and bottom faces engaging said hangers whereby said hangers and brackets support said tile blocks in horizontal courses, said tile blocks having inner fire faces which together define the wall of a high temperature refractory line chamber subject to substantial expansion and contraction as the chamber is heated and cooled, insulation material between the outer faces of said tile and said framework to protect said brackets and framework from heat in said chamber, there being horizontal and vertical joints between said tile blocks opening into said chamber and subject to inflow from said chamber, fire clay in the horizontal and vertical joints between the tile blocks to exclude heat and fluids in said chamber from reaching said brackets, structural framework, and insulation material, certain of the vertical joints between the tile blocks being open to provide for horizontal expansion of said wall, shroud means covering said open vertical joints, the inner faces of said tile blocks being tapered with the tops of the blocks being narrower than the bottoms so that the bottom of a horizontal course overhangs the top of the course immediately beneath it, said overhang serving to prevent inflow by gravity into said horizontal joints of fluid material in said chamber.

7. A furnace as set forth in claim 6 wherein the top and bottom faces of said tile blocks which define said horizontal joints have inner ends that are substantially parallel and which extend at an angle to the horizontal so that the inner ends of said horizontal joints incline upwardly in a direction extending away from said inner faces.

8. A furnace as set forth in claim 7 wherein the inlet openings to said horizontal joints as defined by the bottom inner edge of the inner face of a tile block and the top inner edge of the inner face of the tile immediately below it lie in planes that extend at an angle to the vertical that is greater than the angle of repose of beads piled in the chamber to form pockets at the inlets to said joints which cannot be reached by beads flowing under the influence of gravity.

9. In a high temperature refractory lined vessel or the like having a structural framework and a supporting bracket carried by the framework, the supporting bracket having a vertically extending wall with an opening defined by a substantially horizontally outwardly extending flange providing a ledge adjacent the wall and on the bottom side of the opening, the wall further having a vertical downwardly extending flange formed adjacent the opening on the side of the wall opposite to the horizontally extending flange, a tile hanger adapted to be supported upon the wall and adapted to support a refractory tile block thereupon, said tile hanger having a horizontally disposed plate like body extending through the opening, a pair of parallel spaced upwardly extending flanges formed at one end of said body and adapted to receive the downwardly extending flange of the wall therebetween, said body further having a rib formed on the underside thereof adapted to supportingly engage the horizontally extending flange of the wall and to coact with said upwardly extending flanges to attach said tile hanger to the wall, and a pair of oppositely facing vertically extending flanges formed at the other end of said body for supportingly engaging vertically disposed tile courses thereupon.

References Cited

UNITED STATES PATENTS

| | | | |
|---|---|---|---|
| 971,159 | 9/1910 | Stanway | 263—4 X |
| 1,870,721 | 8/1932 | Foltz | 110—1 X |
| 2,075,955 | 5/1937 | Parsons | 52—573 X |
| 2,369,100 | 2/1945 | Young | 110—1 X |
| 2,581,989 | 1/1952 | Weber | 110—1 X |
| 3,060,641 | 10/1962 | Lockwood | 52—573 X |

FREDERICK L. MATTESON, JR., *Primary Examiner.*

JOHN J. CAMBY, *Examiner.*